(12) United States Patent
Klein et al.

(10) Patent No.: US 8,127,750 B2
(45) Date of Patent: Mar. 6, 2012

(54) METHOD OF USING LEAN FUEL-AIR MIXTURES AT ALL OPERATING REGIMES OF A SPARK IGNITION ENGINE

(75) Inventors: Dennis J. Klein, Clearwater, FL (US); Corneliu Dica, Constanta (RO); Cristian Georgescu, Bucharest (RO); Cristian Pamfilie, Bucharest (RO); Radu Chiriac, Bucharest (RO)

(73) Assignee: Hydrogen Technology Applications, Inc., Clearwater, FL (US)

( * ) Notice: Subject to any disclaimer, the term of this patent is extended or adjusted under 35 U.S.C. 154(b) by 471 days.

(21) Appl. No.: 12/307,402

(22) PCT Filed: Jul. 26, 2007

(86) PCT No.: PCT/RO2007/000013
§ 371 (c)(1),
(2), (4) Date: Jan. 5, 2009

(87) PCT Pub. No.: WO2008/013468
PCT Pub. Date: Jan. 31, 2008

(65) Prior Publication Data
US 2010/0132661 A1    Jun. 3, 2010

(30) Foreign Application Priority Data

Jul. 28, 2006    (RO) .................. A 2006 00606

(51) Int. Cl.
*F02B 43/10* (2006.01)
*F02B 43/12* (2006.01)
(52) U.S. Cl. ............... 123/575; 123/527; 123/3

(58) Field of Classification Search .............. 123/3, 575, 123/527, DIG. 12
See application file for complete search history.

(56) References Cited

U.S. PATENT DOCUMENTS

| | | | | |
|---|---|---|---|---|
| 4,003,345 A * | 1/1977 | Bradley | ............................ | 123/3 |
| 4,343,272 A | 8/1982 | Buck | | |
| 5,660,602 A * | 8/1997 | Collier et al. | ................. | 48/127.3 |
| 5,787,864 A * | 8/1998 | Collier et al. | .................. | 123/492 |
| 5,887,554 A * | 3/1999 | Cohn et al. | ......................... | 123/3 |
| 6,311,648 B1 * | 11/2001 | Larocque | ........................... | 123/3 |
| 6,336,430 B2 * | 1/2002 | de Souza et al. | ................... | 123/3 |
| 6,405,720 B1 * | 6/2002 | Collier, Jr. | ............... | 123/568.12 |
| 6,981,472 B2 * | 1/2006 | Bromberg et al. | ................. | 123/3 |
| 6,994,930 B1 * | 2/2006 | Geisbrecht et al. | ........... | 429/425 |
| 7,028,644 B2 * | 4/2006 | Cohn et al. | ...................... | 123/1 A |
| 7,111,452 B2 * | 9/2006 | Miyoshi et al. | .................. | 60/285 |
| 7,444,994 B2 * | 11/2008 | Ito | ................... | 123/492 |
| 7,451,942 B2 * | 11/2008 | Borissov | .................. | 239/533.12 |
| 7,497,191 B2 * | 3/2009 | Fulton et al. | ....................... | 123/3 |
| 2001/0003276 A1 * | 6/2001 | De Souza et al. | ................. | 123/3 |

(Continued)

FOREIGN PATENT DOCUMENTS

DE    3828764 A1    1/1990
GB    2073317 A    10/1981

*Primary Examiner* — Erick Solis
(74) *Attorney, Agent, or Firm* — Dennis G. LaPointe

(57) ABSTRACT

The present invention refers to a method of using lean fuel-air mixtures at all operating regimes of a spark ignition engine, which is provided with an intake port fuel injection system, wherein said method is characterized in that in order to achieve the efficient lean mixture combustion process, an HHO oxy-hydric gas direct injection should be at a minimum pressure of 10 bar, during compression stroke, after intake valve closing, so that the hydrogen/fuel mixture volumetric fractions value is within the range of about 15% to 25%.

2 Claims, 5 Drawing Sheets

U.S. PATENT DOCUMENTS

| | | | |
|---|---|---|---|
| 2003/0089337 A1* | 5/2003 | Cohn et al. | 123/435 |
| 2004/0035395 A1* | 2/2004 | Heywood et al. | 123/435 |
| 2004/0099226 A1* | 5/2004 | Bromberg et al. | 123/3 |
| 2007/0028905 A1* | 2/2007 | Shinagawa et al. | 123/575 |
| 2007/0209609 A1* | 9/2007 | Shimada et al. | 123/3 |
| 2008/0022982 A1* | 1/2008 | Kamiyama | 123/575 |
| 2008/0223344 A1* | 9/2008 | Suzuki et al. | 123/525 |
| 2010/0049417 A1* | 2/2010 | Bailey et al. | 701/100 |

* cited by examiner a — for a not-fitted spark ignition engine
b — for a three-way catalytic reactor fitted engine

METHOD OF USING LEAN FUEL-AIR MIXTURES AT ALL OPERATING REGIMES OF A SPARK IGNITION ENGINE

FIELD OF INVENTION

The invention refers to a method of using lean fuel-air mixtures at all operating regimes of a spark ignition engine, which can be used for automotive vehicles.

BACKGROUND OF THE INVENTION

It is well known the fuelling method of spark ignition engines by which the classic gasoline supply is performed by sequential injection into the intake port valve at the beginning of each intake stroke. The electronic control by injection, of the fuel-air ratio has a principal goal of maintaining in a range close to the unit value which allows the efficient treatment of burned gases, meaning the limiting of pollutant emissions CO, HC and $NO_x$ [1, . . . , 5]. This method presents the disadvantage that for maintaining the pollutant emissions within the legal admissible limits, it is also necessary to use a three way catalytic reactor and a closed loop control system fitted with a lambda sensor and with an electronic control unit. The efficient functioning of the catalytic reactor at a temperature level of the emission gases of over 300° C. implies the maintaining of a very narrow window of the ratio control around the stoichiometric value, namely 1±0.01, (see FIG. 1). Thus, the actual fuel consumption of the engine is determined by the air intake, the air-fuel stoichiometric ratio, and the relative coefficient of the air-fuel ratio the engine operates for all types of operating regimes.

For the past decade, the attempt to identify and promote, at industrial scale, of some alternative energy sources relative to fossil fuels, as well as to cut down the combustion process related emissions, has been approached at the level of its real importance. New concepts and concerns such as emissions gas management and combined heat and power generation come to draw the attention on the necessity to intensify research on burning processes for the efficient optimization of internal combustion engines.

There is known a method for the addition of a combustible gas, as hydrogen, to the internal combustion engines (see JP Patents no. 2004076679, 2004239138). The hydrogen addition is accomplished directly in the engine cylinders, separately from the regular fuel (gasoline) with the purpose to create a burning mixture with superior qualities which has improved burning efficiency and lower pollutant emissions. The hydrogen addition extends the flammability limits and increases the burning speed of the charge mixture trapped inside the combustion chambers.

The known technical solutions for the hydrogen addition inside the engine as supplementary fuel have been conceived especially to solve detonation phenomenon, this being the primary objective. These known methods have the disadvantage that they do not ensure the CO2 quantity reduction.

As concerns the effort to obtaining a non-pollutant gas fuel for industrial use, there has been obtained an oxy-hydric gas produced using equipment disclosed in U.S. Pat. No. 6,689,259 and in the international publication no. WO2005/076767 A3, both in the name of Klein. This gas is obtained by a controlled dissociation, in an electromagnetic field, of alkaline water. This fuel gas, electrochemically active, obtained through the water electrolysis reaction is a mixture of 63-66% hydrogen, 30-35% oxygen and other compounds of these ones such as the hydrogen peroxide. The oxy-hydric gas obtained can be classified in the oxy-hydric gas group and commonly named as the HHO oxy-hydric gas.

An example of the electrolyzer equipment used in the disclosures of U.S. Pat. No. 6,689,259 and more particularly, in publication WO2005/076767 A3, is an electrolysis chamber such that a gas reservoir region is formed above the aqueous electrolyte solution, two principal electrodes comprising an anode electrode and a cathode electrode, the two principal electrodes being at least partially immersed in the aqueous electrolyte solution, a plurality of supplemental electrodes at least partially immersed in the aqueous electrolyte solution and interposed between the two principal electrodes wherein the two principal electrodes and the plurality of supplemental electrodes are held in a fixed spatial relationship, and wherein the supplemental electrodes are not connected electrically to a power source, and for each supplemental adjacent electrodes, one is made of high porosity foam based material made substantially of a nickel material (preferably greater than 99% nickel in a foam material where the high porosity electrode results in a composite lattice-like configured electrode due to the use of foam and nickel fibers or powder) and the opposing electrode is made substantially of a stainless steel material, wherein said supplemental electrodes results in a (+) and (−) electrical (ionic) current flow that causes the formation of a single combustible gas over an entire surface area of both sides of all electrodes within the electrolyzer. Other configurations of electrodes are permissible however the above configuration has been found to be very effective in producing the desired gas.

SUMMARY OF THE INVENTION

The technical problem that the invention solves consists in leaning the fuel-air mixture further to passing from the present used quasi-stoichiometric ratio (the d-e-f curve) to lean ratios (the a-b-c curve) for partial and high load operating regimes, however at the same time assuring the safe ignition as well as the stable and efficient combustion of the fuel-air mixture, (see FIG. 2).

According to the invention, the method assures the elimination of the disadvantages of the known fueling method, namely by the fact that for the efficient burning of the lean mixture, the HHO oxy-hydric gas injection is provided at a pressure level of at least 10 bar inside the cylinder, during the compression stroke, after the intake valve closing, so that the hydrogen volumetric fraction in the fuel mixture should be around of 15%-25%.

These conditions determine a less sensitive combustion process to the fuel-air quality modification and to the compression ratio modification than the pure hydrogen injection. This aspect is highly amplified by the presence, in the HHO oxy-hydric gas composition, of the oxygen molecule, besides hydrogen, in a ratio that is quite close to the stoichiometric one. The lowering-down of the initial combustion stage duration by approximately 15%, in case of the hydrogen injection, is amplified, and becomes approximately 25% in case of the HHO oxy-hydric gas injection.

Further to applying the invention, the below listed advantages can be obtained:

the cut-down of the average fuel consumption of the motor by 5-20%;

the cut-down of the average level of the CO emission by 60-80%;

the cut-down of the average level of the HC unburned hydrocarbon emissions by 20-30%;

the cut-down of the average level of nitrogen oxide $NO_x$ emissions by 50-70%; and the cut-down of the $CO_2$ level by 5-20%.

BRIEF DESCRIPTION OF THE DRAWINGS

There will follow an example to carry out the method of the invention as per FIGS. 1-5, which are.

DETAILED DESCRIPTION OF THE INVENTION

The invention refers to a method of using lean mixtures for all operating regimes of a spark ignition engine provided with a gasoline multipoint fuel injection system into the intake valve ports, and with a direct injection system for the HHO oxy-hydric gas.

According to the invention, the method relies in the fact that, besides the classical gasoline, the hydrogen enriched HHO oxy-hydric gas, containing oxygen, too, is also injected into the engine cylinders.

The method allows the use of lean mixtures that are characterized by a relative air-fuel ratio increased from the actual values, namely 0.99-1.01, in case of three-way catalytic reactor engines, to higher values of 1.6-1.8, while increasing the compression ratio from 10.0-10.5 to 12-14. The performances restoration of the engine power is possible by managing the HHO oxy-hydric gas quantity injected into the engine cylinders so that the hydrogen volumetric fractions in the fuel mixture being about 15%-25%.

The decreasing of the burning speed (in the initial stage of the flame kernel formation and development, and in the main stage of flame propagation) which inevitably occurs by mixture leaning, as well as the incomplete combustion tendency, the failed ignition, or the misfire occurrence situations, which particularly leads to the increase of the unburned hydrocarbons concentration in the exhaust gases, are compensated by injecting into the cylinder, after the intake valve closing, the HHO oxy-hydric gas that is rich in hydrogen and contains oxygen, too.

Figure 1:
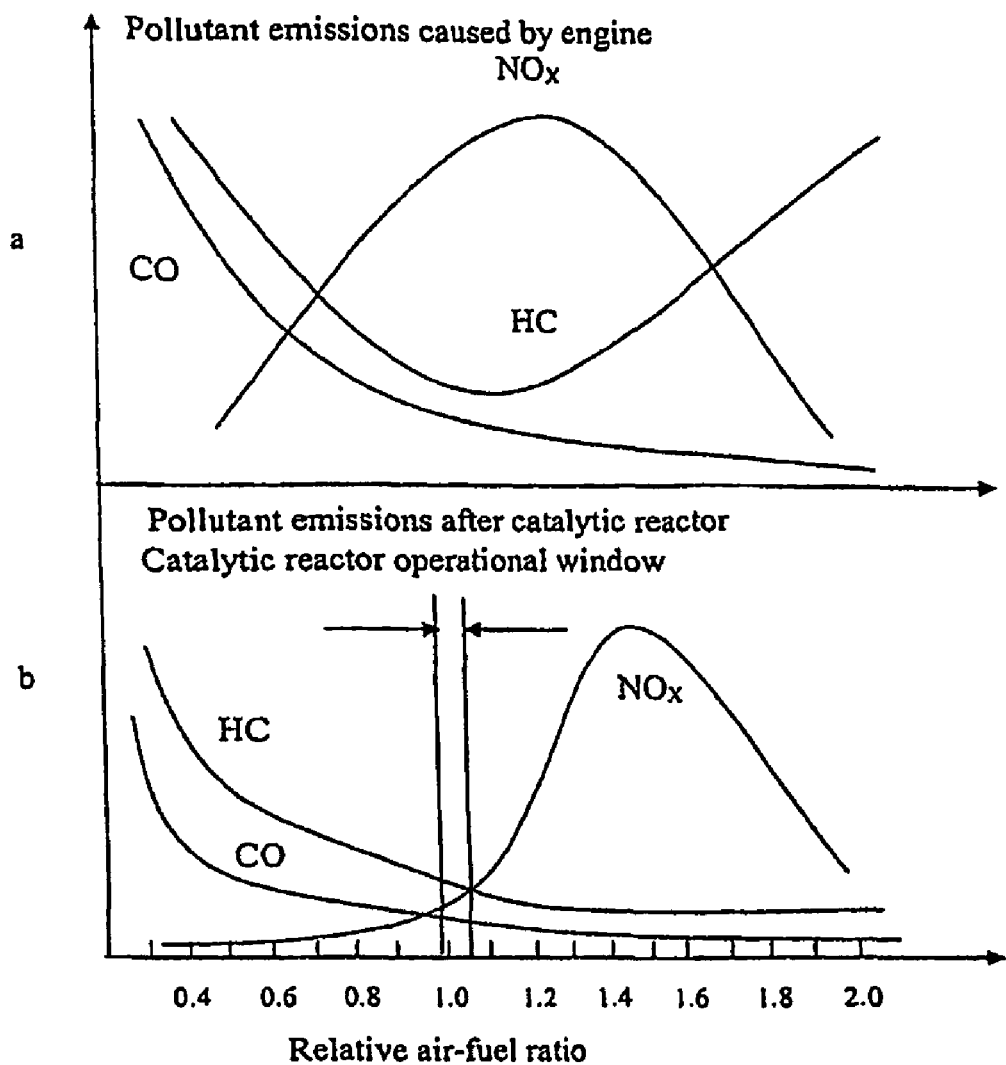
FIG. 1 is a representative pollutant emissions variation chart depending on the relative air-fuel ratio, lambda for a not-fitted spark ignition engine, and for a three-way catalytic reactor fitted engine, respectively.
Figure 2:
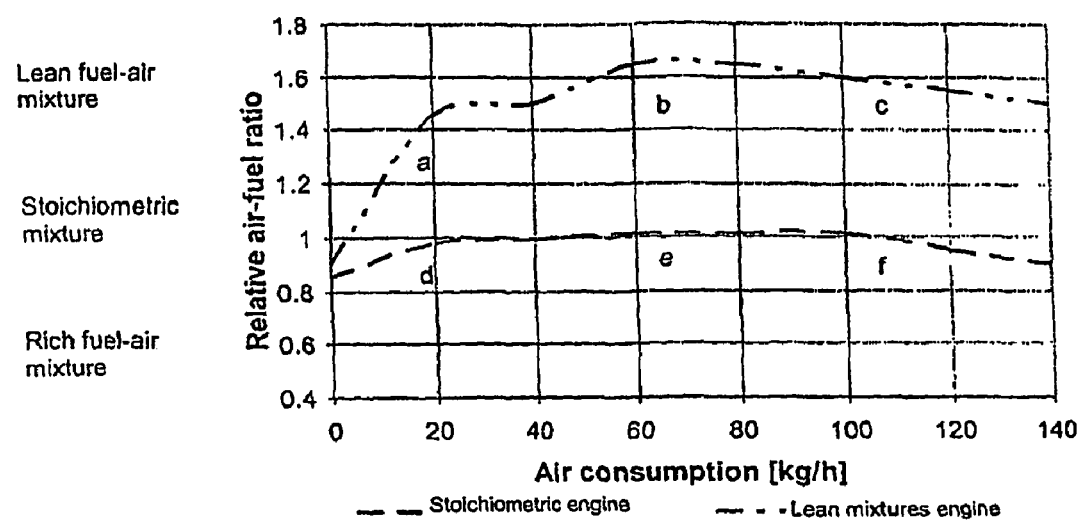
FIG. 2 is a variation chart of the relative air-fuel ratio, depending on the air consumption in case of a stoichiometric spark ignition engine, and in a lean mixtures engine, respectively.
Figure 3:
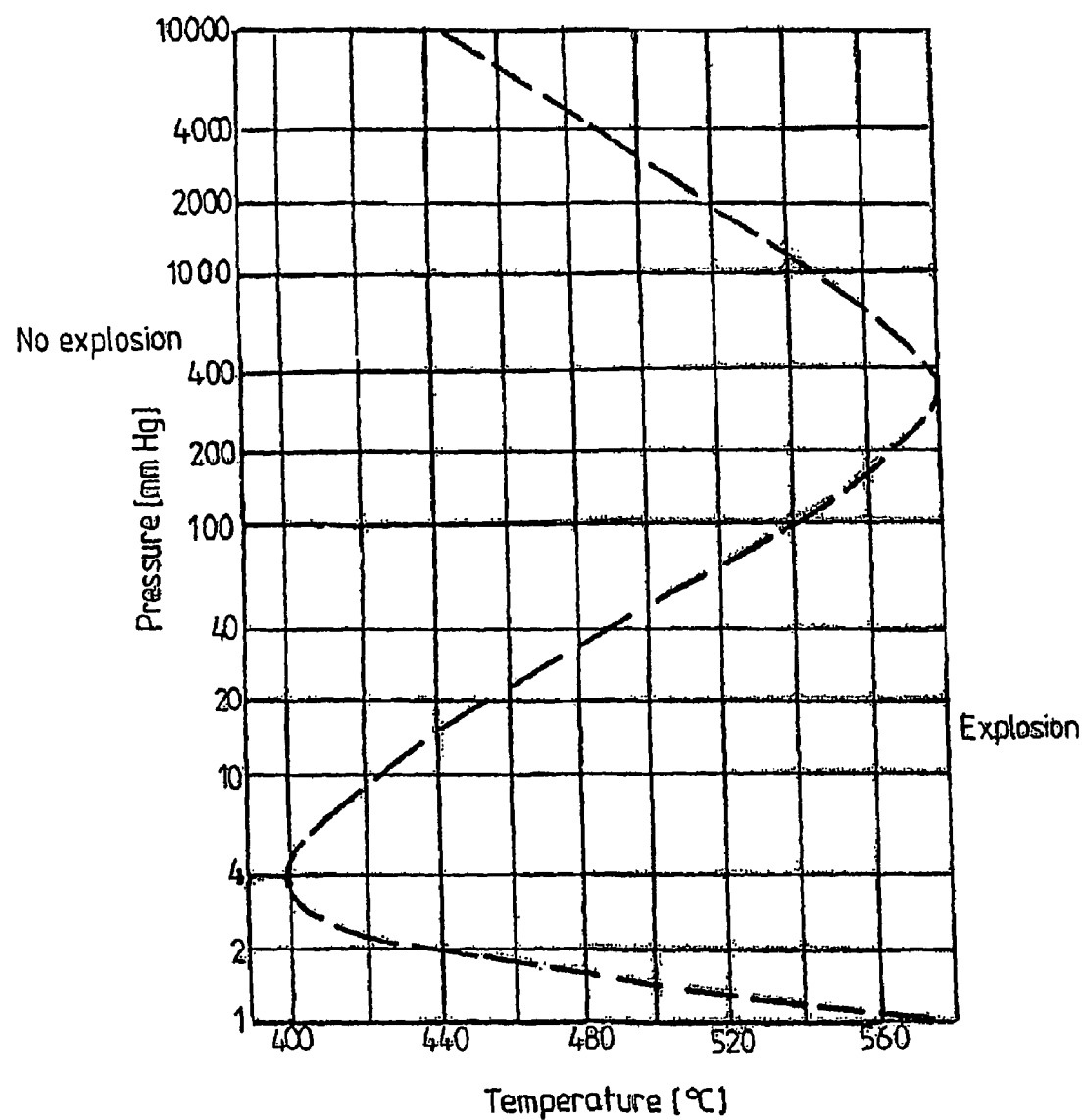
FIG. 3 is an explosion limit chart in the case of stoichiometric hydrogen-oxygen mixture.

The hydrogen enriched HHO oxy-hydric gas, which has a complex composition, is kept in an auxiliary tank, at a pressure of maximum 15 bar, so that its temperature should not exceed 695 K, and, therefore, the explosion risk (FIG. 3) shall be avoided.

Figure 4:
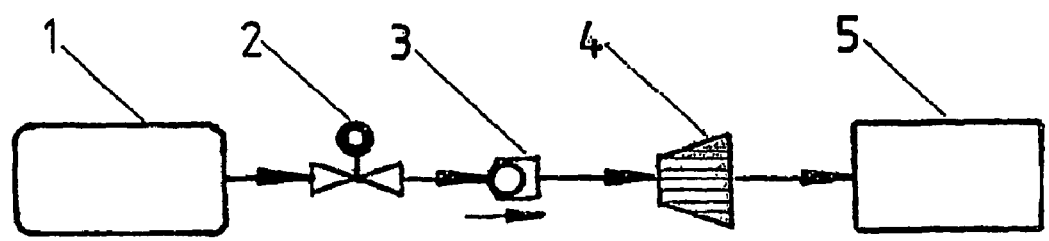
FIG. 4 is a representative flow chart of the engine fuelling system with the hydrogen enriched HHO oxy-hydric gas.

The HHO gas flow is electronically controlled so that to maintain the volumetric hydrogen/gasoline fraction in the range 15%-25%. By means of an additional fueling system provided with an auxiliary tank 1, a pressure regulator 2, a one-way electromagnetic valve 3 and a flame arrestor 4, the gas it is directly supplied into the cylinder 5 (FIG. 4) during the compression stroke, after the intake valve closing, so that to avoid loss of fresh charge from the cylinder.

Figure 5:
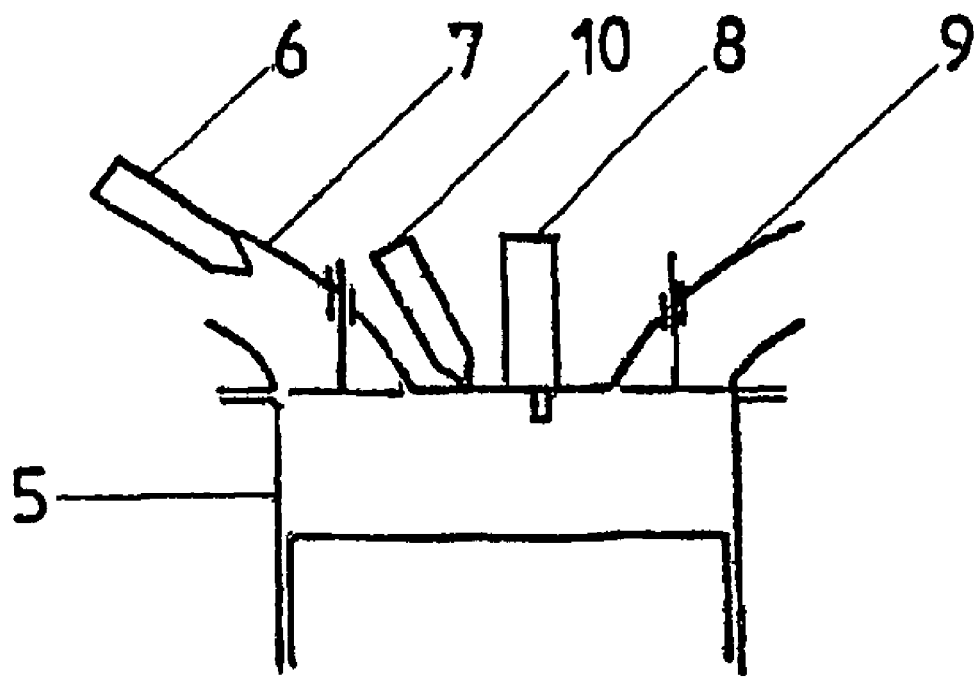
FIG. 5 is a cylinder-head schematic of a spark ignition engine fitted with an injector for the direct in cylinder injection of the hydrogen enriched HHO oxy-hydric gas.

The original cylinder head of the multipoint port fuel injection spark ignition engine containing the gasoline injector 6, placed on the intake port 7, the spark plug 8, and the exhaust port 9, is equipped with the HHO direct in cylinder injector 10 (FIG. 5).

The HHO gas injection is performed in electronically controlled quantities at the pressure of at least 10 bar; it is achieved for the engine cylinder 5 by means of the injector 10 whose nozzle gets directly into the combustion chamber. Depending on the engine geometry and operational regime, the initial moment of the HHO oxy-hydric gas injection shall be placed between 100 and 60 CAD (Crank Angle Degrees) before the top dead centre at the end of compression stroke in view of avoiding the gas self-ignition and uncontrolled combustion.

The stabilized burning of the lean fuel-air mixtures can be achieved due to hydrogen combustion characteristics that involve wide flammability limits, high burning laminar speed and reduced minimum ignition energy. The HHO oxy-hydric gas, rich in hydrogen, contains, besides this hydrogen, the necessary oxygen for the extremely rapid combustion process, and no additional oxygen consumption, form the existing air trapped inside the engine is necessary. The injected HHO gas quantity operates like a pilot and it ignites firstly promoting the combustion inside the whole combustion chamber over a lean gasoline-air mixture.

The avoidance management of the knock phenomenon, which may occur with the compression ratio increasing, shall be achieved both by combustion stage decreasing, equivalent to an early stage combustion acceleration, and also by diminishing effect of the appearance of hydroxyl radicals further to fuel decomposition during the burning process.

The avoidance management of the increasing cyclic variability that occurs when using lean mixtures shall be achieved by the correct positioning, inside the cylinder-head, of the HHO oxy-hydric gas injector, and also by the adequate gas distribution inside the cylinder. Due to the hydrogen diffusivity, approximately 10 times higher than gasoline, it becomes possible to get the ignition of certain generally lean mixtures that, however, contain hydrogen and oxygen within the flammability limits.

The carbon dioxide ($CO_2$) emission quantity from the spark ignition engine, under the circumstances of applying the new method of using lean mixtures, can be, thus decreased by at most 45%, in other words, approximately by the average relative value of the deviation between the relative fuel-air ratios (1-1/1.7)/1=41%.

The method can be associated with constructive solutions for spark ignition engines with downsized cylinder displacement volume, which are provided with supercharging equipments and with performance ignition systems of high power or energy.

The method is applied in view of using lean fuel-air mixtures for partial or high load operating regimes related to a spark ignition engine, by also assuring a stable burning process of these mixtures by means of an additionally injection, directly into the cylinder, of some HHO oxy-hydric gas containing hydrogen and oxygen. The lean fuel-air mixtures have, as compared to the rich fuel mixtures, at the same temperature and pressure levels, a narrower range of the flammability limits and a more reduced burning velocity. The compensation of these effects, in order to facilitate ignition and make the combustion process more stable and more efficient, can be achieved by introducing, inside the cylinder, the HHO oxy-hydric electronically controlled gas quantities that would, thus, grant the hydrogen/fuel volumetric fractions within the range of 15-25%.

At the same time, the method makes possible the modification of the spark timing characteristics upon the occurrence of the electric discharge that must go from the usual domain of 12-40 RAC, which is characteristic for the stoichiometric engines with intake valve port injection, to the 15-50 CAD area which is necessary for the lean mixtures operated engines.

All these are due to the large flammability limits and to the high burning speed that is close to that of the molecular hydrogen-oxygen stoichiometric mixture, and that is characteristic of the HHO oxy-hydric gas, which determines the initiation and the rapid development of the flame kernel even for lean fuel mixtures that are improper to the normal operation of the spark ignition engines.

According to the invention, it is very important for the method, that rapid and efficient burning process is achieved without any oxygen consumption from that corresponding in the air trapped inside the cylinders after the intake valve closing, for the hydrogen combustion.

So that, for the method being applied according to the invention, has to be noticed, that besides the knock phenomenon and cyclic variability management, a set of improvement measures on the combustion parameters is achieved, and there has also been noticed that the HHO oxy-hydric gas injection leads to the following:

the use of lean fuel-air mixtures;

the use of high compression ratios, from 10 to 10.5 which are the normal values for the spark ignition stoichiometric engines, to ratios from the diesel engine area, from 12 to 14;

the combustion shall be quickly initiated; and the cyclic variability coefficient decreases.

The invention claimed is:

1. A method of using lean fuel-air mixtures at all operating regimes of a spark ignition engine, which is provided with an intake port fuel injection system, wherein said method is characterized in that in order to achieve an efficient lean mixture combustion process, an HHO oxy-hydric gas is directly injected at a minimum pressure of 10 bar, during compression stroke, after intake valve closing, so that a hydrogen/gasoline mixture volumetric fraction value is within a range of 15% to 25%.

2. The method according to claim 1, wherein the HHO oxy-hydric gas direct injection is at a maximum pressure of 15 bar.

* * * * *